Patented Nov. 19, 1935

2,021,552

UNITED STATES PATENT OFFICE 2,021,552

PROCESS OF IMPROVING THE TASTE OF HYDROGENATED OILS

Dietrich Hildisch, Oslo, Norway

No Drawing. Application March 16, 1933, Serial No. 661,181. In Germany January 5, 1932

2 Claims. (Cl. 87—12)

Oils, fats and fatty acids which are liquid at normal temperature may, as is known, be converted into fats or acids of higher melting point by hydrogenation. This hydrogenation is performed in the manner, that the fatty substances are treated with hydrogen under pressure in the presence of suitable catalysts, such as for instance nickel. By this treatment the properties of the oils and fats are widely altered and particularly in regard to fish liver oils and other oils of fishes and other sea animals the specifical disagreeable fish odor is removed. However, a drawback of the hydrogenation treatment is, that oils or fats containing fatty acids with double bindings will take up a peculiar taste which usually is named the catalyst taste. This is particularly the case at fish oils (for instance herring oils), seal oils, whale oils and also at slightly or highly drying vegetable oils such as for instance linseed oil, cotton seed oil and soya oil. It has hitherto not been possible to find out in which way this peculiar taste is developed and the attempts which hitherto have been made to remove the catalyst taste have not been successful. The said disagreeable taste is neither removed by the usual steam treatment.

The present invention relates to a process which represents a complete solution of the problem in question and which makes it possible to produce hydrogenated fatty substances, which are fully free from any catalyst taste and odor and which lastingly will have these qualities. It is therefore possible, by means of the novel process, to produce high-quality edible fats from low-quality fatty substances.

According to the present invention oils and fats are after the hydrogenation treated with substances which when heated will split off gases or vapors, such as for instance ammonia, carbon dioxide, oxygen or the like. Particularly suited for the purpose in question are substances which are completely decomposed at higher temperatures, such as for instance ammonium carbonate, which, as will be known, very readily gives off ammonia and carbon dioxide when being heated.

The novel treatment may also be carried out with substances which already at normal temperature, eventually in the presence of a catalyst, will split off gases or vapors. Besides ammonium carbonate for instance the following substances may be used: ammonium carbamates, ammonium chloride with sodium nitrite, ammonium nitrite, urea, bicarbonates alone or with an addition of a volatile acid or acids adapted to form insoluble salts in the fat, inorganic and organic peroxides, for instance benzyl superoxide, diethanolamines and triethanolamines.

The treatment should suitably take place immediately after the hydrogenation. The hydrogenated oil leaves the hydrogenation plant at a temperature of about 200° C. The oil is allowed to cool to about 130–70° C. and a small amount of the substance chosen for the purpose is added. The oil is maintained at this temperature for some hours under continuous stirring and is thereupon subjected to the usual further treatment. As soon as the added substance comes into contact with the hot oil a vigorous generation of gas commences. The heating under stirring is continued until the formation of gas again has ceased.

The effect obtained by adding ammonium carbonate or other substances adapted to split off gases may be raised by passing gases or vapors through the charge. In this case gases or vapors, such as for instance ammonia, carbon dioxide, oxygen or the like, are conducted through the hydrogenated oil when this is under the influence of the gas-yielding agent added.

The described process may also be combined with the usual steam treatment of the hydrogenated oils. In this case the process may be carried out in the same vessel as the steam treatment, if desired under vacuum.

The amount of the gas-yielding substances to be used varies within wide limits, in accordance with the nature of the fats and the nature of the added substances. Usually quantities from about half a percent up to a few percents will be needed. Also the duration of the treatment varies in accordance with the nature of the fats and the quantity and nature of the added substances. The quantity of the gas-yielding substance to be used may be added all at once or step by step. The process may also be carried out simultaneously with the refining of the fatty matter.

Example 1000 kg. of hardened herring oil obtained from a hydrogenation plant are allowed to cool to about 70° C. in a container which is equipped with a stirring device .5 kg. of ammonia carbonate are added and the fat is maintained at the said temperature for some hours under continuous stirring, whereupon the mixture is subjected to the usual further treatment with steam and the like. The product of this process is an edible fat, which is completely tasteless and completely odorless and which as to its properties is fully equal to the best edible fats of vegetable or animal origin hitherto known. A particular advantage of the novel process is, that the hardening may be carried out at lower temperatures than hitherto. It is for instance possible to work at a melting point below 32° C.

It has already been proposed to deodorize hardened fats by blowing air, oxygen, steam and the like into the same. The effects obtained by the present process, i. e. above all the complete elimination of the catalyst taste, can however not at all (or under any conditions only with great difficulties) be obtained by the above named agents. A prolonged treatment with air or oxygen at raised temperature will also impair the taste of the fats. In contrast hereto an addition of substances which decompose rapidly at raised temperatures, such as for instance ammonium carbonate and ammonium carbaminate, will cause a complete removal of the catalyst taste and simultaneously a complete deodorization.

The process described above may of course be varied in different ways without departing from the spirit of the invention the scope of which is set forth in the annexed claims.

I claim:

1. A process of removing the catalyst taste from hydrogenated oils and particularly from fish oils and oils from other sea-animals and drying vegetable oils, comprising adding ammonium carbonate to hydrogenated oils in hot state and mixing thoroughly until gas formation ceases.

2. A process of removing the catalyst taste from hydrogenated oils and particularly from fish-oils and oils from other sea-animals and drying vegetable oils, comprising adding to the hydrogenated oils, an alkaline compound selected from a group consisting of ammonium carbonate, ammonium carbamate, alkaline metal bi-carbonate, diethanolamines and triethanolamines which are adapted to be decomposed and give off volatile constituents, and finally mixing said oils and compound, at a temperature at which the selected compound will decompose, until the formation of gas ceases.

DIETRICH HILDISCH.